US012673347B2

(12) United States Patent
Giusti et al.

(10) Patent No.: US 12,673,347 B2
(45) Date of Patent: Jul. 7, 2026

(54) MEMS ULTRASONIC TRANSDUCER DEVICE WITH IMPROVED DAMPING OF THE OSCILLATIONS OF A MEMBRANE OF THE SAME, AND MANUFACTURING PROCESS OF THE SAME

(71) Applicant: STMICROELECTRONICS S.r.l., Agrate Brianza (IT)

(72) Inventors: Domenico Giusti, Caponago (IT); Marco Ferrera, Concorezzo (IT); Lorenzo Tentori, Verano Brianza (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 826 days.

(21) Appl. No.: 18/053,718

(22) Filed: Nov. 8, 2022

(65) Prior Publication Data

US 2023/0166293 A1     Jun. 1, 2023

(30) Foreign Application Priority Data

Nov. 19, 2021     (IT) .......................... 102021000029288

(51) Int. Cl.
*B06B 1/06*      (2006.01)
*G01S 15/08*     (2006.01)

(52) U.S. Cl.
CPC .......... *B06B 1/0681* (2013.01); *B06B 1/0629* (2013.01); *B06B 1/0651* (2013.01); *B06B 1/0666* (2013.01); *G01S 15/08* (2013.01)

(58) Field of Classification Search
CPC ... B06B 1/0681; B06B 1/0629; B06B 1/0651; B06B 1/0666; B06B 1/0685; G01S 15/08
See application file for complete search history.

(56) References Cited

U.S. PATENT DOCUMENTS 5,585,011 A      12/1996  Saaski et al.
7,344,907 B2      3/2008  Colgan et al.
(Continued)

FOREIGN PATENT DOCUMENTS

CN       101542122 A     9/2009
CN       104249990 A    12/2014
(Continued)

OTHER PUBLICATIONS

Fischer et al., "Integrating MEMS and ICs," *Microsystems & Nanoengineering*, (2015) 1, 15005, 16 pages.

*Primary Examiner* — Emily P Pham
(74) *Attorney, Agent, or Firm* — Seed IP Law Group LLP

(57)                ABSTRACT

MEMS ultrasonic transducer, MUT, device, comprising a semiconductor body with a first and a second main surface and including: a first chamber extending into the semiconductor body at a distance from the first main surface; a membrane formed by the semiconductor body between the first main surface and the first chamber; a piezoelectric element on the membrane; a second chamber extending into the semiconductor body between the first chamber and the second main surface; a central fluidic passage extending into the semiconductor body from the second main surface to the first chamber and traversing the second chamber; and one or more lateral fluidic passages extending into the semiconductor body from the second main surface to the second chamber. The one or more lateral fluidic passages, the central fluidic passage and the second chamber define a fluidic recirculation path that fluidically connects the first chamber with the outside of the semiconductor body.

20 Claims, 8 Drawing Sheets

(56) References Cited

U.S. PATENT DOCUMENTS

| | | |
|---|---|---|
| 7,767,484 B2 | 8/2010 | Ayazi |
| 7,928,960 B2 | 4/2011 | Baldo et al. |
| 8,173,513 B2 | 5/2012 | Villa et al. |
| 8,633,553 B2 | 1/2014 | Ferrera et al. |
| 9,233,834 B2 | 1/2016 | Faralli et al. |
| 9,688,531 B2 | 6/2017 | Baldo et al. |
| 2005/0208696 A1 | 9/2005 | Villa et al. |
| 2006/0203326 A1 | 9/2006 | Fu |
| 2008/0224242 A1 | 9/2008 | Villa et al. |
| 2009/0115008 A1 | 5/2009 | Ziglioli et al. |
| 2009/0232683 A1 | 9/2009 | Hirata et al. |
| 2010/0096714 A1 | 4/2010 | Nakatani |
| 2010/0164025 A1 | 7/2010 | Yang et al. |
| 2010/0284553 A1 | 11/2010 | Conti et al. |
| 2010/0330721 A1 | 12/2010 | Barlocchi et al. |
| 2012/0018819 A1 | 1/2012 | Ferrera et al. |
| 2014/0299949 A1 | 10/2014 | Conti et al. |
| 2014/0313264 A1 | 10/2014 | Cattaneo et al. |
| 2015/0001645 A1 | 1/2015 | Faralli et al. |
| 2015/0001651 A1 | 1/2015 | Faralli et al. |
| 2015/0059749 A1 | 3/2015 | Nitta |
| 2015/0071797 A1 | 3/2015 | Takeuchi |
| 2016/0119722 A1 | 4/2016 | Chu et al. |
| 2016/0167945 A1 | 6/2016 | Chang et al. |
| 2016/0318757 A1 | 11/2016 | Chou et al. |
| 2017/0001857 A1 | 1/2017 | Jeong et al. |
| 2017/0021391 A1 | 1/2017 | Guedes et al. |
| 2017/0144881 A1 | 5/2017 | Baldo et al. |
| 2017/0190179 A1 | 7/2017 | Menzel et al. |
| 2017/0253477 A1 | 9/2017 | Baldo et al. |
| 2018/0127263 A1 | 5/2018 | Tai et al. |
| 2020/0325888 A1 | 10/2020 | Giusti et al. |
| 2022/0169497 A1* | 6/2022 | Savoia ................... H04R 17/00 |

FOREIGN PATENT DOCUMENTS

| | | | |
|---|---|---|---|
| CN | 105612439 A | 5/2016 |
| CN | 106744649 A | 5/2017 |
| CN | 108246593 A | 7/2018 |
| CN | 109150135 A | 1/2019 |
| CN | 111212370 A | 5/2020 |
| CN | 111828289 A | 10/2020 |
| CN | 112004181 A | 11/2020 |
| CN | 212508742 U | 2/2021 |
| CN | 219765916 U | 9/2023 |
| EP | 2096448 A2 | 9/2009 |
| EP | 1577656 B1 | 6/2010 |
| EP | 2789578 A2 | 10/2014 |
| EP | 3656478 A1 | 5/2020 |
| JP | 5636555 B2 | 12/2014 |

* cited by examiner

MEMS ULTRASONIC TRANSDUCER DEVICE WITH IMPROVED DAMPING OF THE OSCILLATIONS OF A MEMBRANE OF THE SAME, AND MANUFACTURING PROCESS OF THE SAME

BACKGROUND

Technical Field

The present disclosure relates to at least one MEMS ultrasonic transducer (MUT) device with improved damping of the oscillations of a membrane of the same, and to a manufacturing process of the same. In particular, the present disclosure relates to at least one MUT device formed in a semiconductor body and comprising one or more MUT elements, each having a fluidic recirculation path facing a face of the semiconductor body which is opposite to the one or more respective vibrating membranes of the one or more MUT elements with respect to the semiconductor body.

Description of the Related Art

As known, proximity sensors comprise time-of-flight sensors. In particular, the time-of-flight sensors may be ultrasonic transducers, for example made using MEMS ("Micro Electro-Mechanical Systems") technology.

In use, ultrasonic transducers are immersed in a fluid (generally having low density, e.g., air) and are controlled to generate and detect ultrasonic acoustic waves (e.g., with a frequency comprised between 20 kHz and 500 MHz, for example equal to 2 or 3 MHz). In detail, as exemplarily shown in FIG. 1, the ultrasonic transducer T generates an ultrasonic wave (or emitted wave, indicated in FIG. 1 with the reference $W_e$) which, in the presence of objects O arranged along the acoustic wave propagation direction, is reflected forming an ultrasonic echo (or reflected wave, indicated in FIG. 1 with the reference $W_r$) detectable through the same ultrasonic transducer T; the time distance between the emission of the emitted wave $W_e$ and the reception of the reflected wave $W_r$ is indicative of a relative distance D between the ultrasonic transducer T and the detected object O. As a result, by measuring the time-of-flight, it is possible to have information about the object O to be detected. In greater detail, the ultrasonic transducer T comprises a membrane which, for example piezoelectrically or capacitively, is controllable to oscillate in order to generate the emitted wave $W_e$. This membrane is also configured to oscillate when the reflected wave $W_r$ impinges on the ultrasonic transducer T; therefore this allows the reflected wave $W_r$ to be detected, for example piezoelectrically or capacitively.

FIG. 2 shows, as a function of time, a displacement (indicated in FIG. 2 with the reference $X_m$) of the membrane of the ultrasonic transducer T with respect to a rest position of the membrane (i.e., corresponding to the position that the membrane assumes when it is not oscillating, and therefore when the ultrasonic transducer T is neither emitting nor detecting). As it may be noted, the graph of FIG. 2 shows a first waveform $X_{m,e}$ indicative of the displacement of the membrane that generates the emission of the emitted wave $W_e$, and a second waveform $X_{m,r}$ indicative of the displacement of the membrane generated by the reception of the reflected wave $W_r$ in succession to each other. The first waveform $X_{m,e}$ has a first portion with an oscillatory trend along a ring-up interval Tup, where the respective peaks of the first waveform $X_{m,e}$ have a maximum amplitude increasing as a function of time, and a second portion consecutive to the first portion and with an oscillatory trend along a ring-down interval $T_{down}$, where the respective peaks of the first waveform $X_{m,e}$ have a maximum amplitude decreasing as a function of time (e.g., in an exponential manner). The ring-up interval $T_{up}$ corresponds to the time interval necessary to cause the membrane to oscillate at the desired emission frequency of the emitted wave $W_e$, while the ring-down interval $T_{down}$ corresponds to the time interval necessary to interrupt the membrane oscillation (e.g., the ring-down interval $T_{down}$ ends when the membrane oscillation has a maximum amplitude smaller than a maximum threshold amplitude, for example comparable to measurement noise). The second waveform $X_{m,r}$ has instead an oscillatory trend along an echo interval $T_{echo}$, where the respective peaks of the second waveform $X_{m,r}$ have a first maximum amplitude increasing and then decreasing as a function of time. Generally, between the emission of the emitted wave $W_e$ and the reception of the reflected wave $W_r$ (in other words, between the end of the ring-down interval $T_{down}$ and the beginning of the echo interval $T_{echo}$) there is a blind-zone interval $T_{blind}$ which, during the correct operation of the ultrasonic transducer T, is not null. In detail, the sum of the ring-up interval $T_{up}$, the ring-down interval $T_{down}$ and the blind-zone interval $T_{blind}$ defines the time-of-flight $T_{TOF}$ of the ultrasonic transducer T. As a result, the blind-zone interval $T_{blind}$ is correlated to the relative distance D of the object O with respect to the ultrasonic transducer T.

However, when the relative distance D is less than a threshold relative distance, the emitted wave $W_e$ and the reflected wave $W_r$ end up partially superimposing (i.e., the blind-zone interval $T_{blind}$ is zero) making it difficult to discriminate the reflected wave $W_r$ from the emitted wave $W_e$, and therefore complicating or making it impossible to measure the relative distance D. In other words, the threshold relative distance (also known as the blind region) is the minimum detectable relative distance D between the object O and the ultrasonic transducer T, without any loss of information due to the superposition of the emitted wave $W_e$ and the reflected wave $W_r$.

The known ultrasonic transducers T are optimized during design to have a high figure of merit (e.g., greater than 150), so as to reduce their energy loss during operation. However, a smaller bandwidth of the energy spectrum of the membrane oscillation and a lower damping of this oscillation correspond to an increasing figure of merit. In other words, a greater ring-down interval $T_{down}$ corresponds to a greater figure of merit, and therefore the blind-zone interval $T_{blind}$ is reduced. Since the blind-zone interval $T_{blind}$ decreases, the risk of superimposition of the emitted wave $W_e$ and the reflected wave $W_r$ and therefore the risk of not being able to detect the relative distance D increases. As a result, as the figure of merit increases, the minimum detectable threshold relative distances increase. This is mainly due to the fact that the ultrasonic transducer T usually operates immersed in a low-density propagation medium (e.g., air) which does not allow effective damping of the membrane oscillation especially at the working oscillation frequencies typical of the membrane (e.g., about 2 MHz), and has as a result the fact that the known ultrasonic transducers T cannot detect objects O that are too proximate thereto.

Known solutions to increase the damping of the membrane oscillation comprise the use of passive dampers (e.g., layers of suitable polymeric material arranged on the membrane) or active dampers (e.g., supplying the membrane with counter-phase excitations following active pulses which cause the membrane to oscillate) or of algorithms to detect the decay variation, caused by the reflected wave $W_r$, of the envelope of the second portion of the first waveform $X_{m,e}$ in order to compensate for the effects thereof. However, these solutions have numerous criticalities such as identifying suitable dampers which allow, even as the environmental conditions of the fluid having the ultrasonic transducer T immersed therein vary, a correct coupling between the impedance of the ultrasonic transducer T and the power dissipation of the fluid, or coupling problems between the impedance of the ultrasonic transducer T and the power dissipation of the fluid, or an excessive dependence on the shape of the second waveform $X_{m,r}$ and on the object O to be detected.

BRIEF SUMMARY

The present provides at least one MEMS ultrasonic transducer device and a manufacturing process of the same that overcome the drawbacks of the prior art.

For example, in at least one embodiment of the present disclosure, a MEMS ultrasonic transducer device comprising: a semiconductor body of semiconductor material having a first and a second main surface and integrating a first MUT element which includes: a first chamber extending into the semiconductor body at a distance from the first main surface; a membrane formed by the semiconductor body between the first main surface and the first chamber; a piezoelectric element extending on the first main surface of the semiconductor body above the membrane; a second chamber extending into the semiconductor body between the first chamber and the second main surface; a central fluidic passage extending into the semiconductor body from the second main surface to the first chamber and traversing the second chamber; and one or more lateral fluidic passages extending into the semiconductor body from the second main surface to the second chamber, wherein the one or more lateral fluidic passages, the central fluidic passage and the second chamber define a fluidic recirculation path that fluidically connects the first chamber with the outside of the semiconductor body.

BRIEF DESCRIPTION OF THE SEVERAL VIEWS OF THE DRAWINGS

For a better understanding of the present disclosure, preferred embodiments are now described, purely by way of non-limiting example, with reference to the attached drawings, wherein.

DETAILED DESCRIPTION

Figures 3, 4, 5:
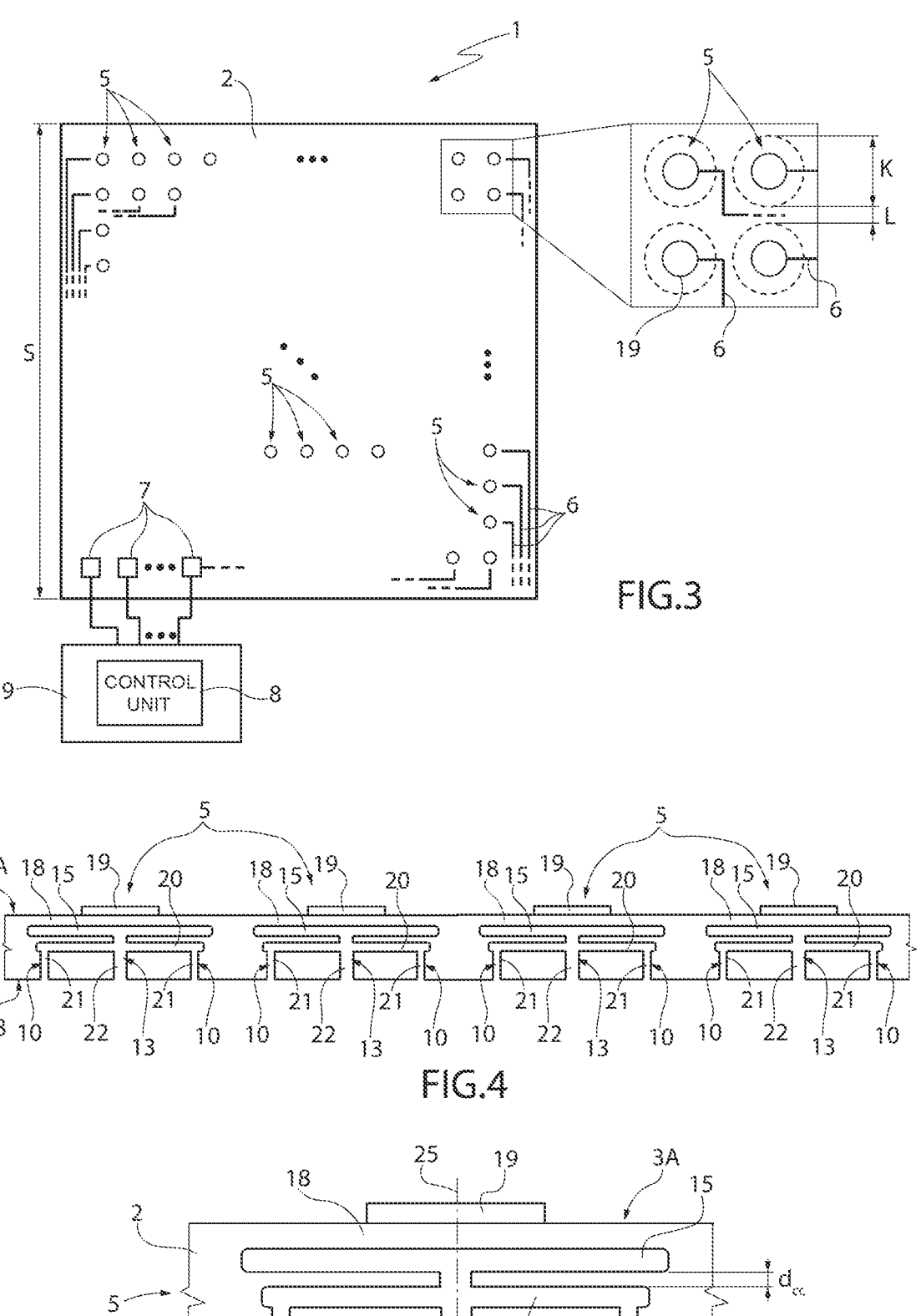
FIG. 3 is a top view of an embodiment of the present ultrasonic transducer device.
FIG. 4 shows a cross-section through a portion of the ultrasonic transducer device of FIG. 3, relating to a plurality of actuator elements arranged side by side.
FIG. 5 shows an enlarged cross-section through a portion of the ultrasonic transducer device of FIG. 3, relating to a single actuator element.

FIG. 3 schematically shows an ultrasonic transducer device 1 made using MEMS technology, and therefore hereinafter also referred to as the MUT ("Micromachined Ultrasonic Transducer") device. For example, the MUT device 1 is integrated into a die 2.

Figure 1:
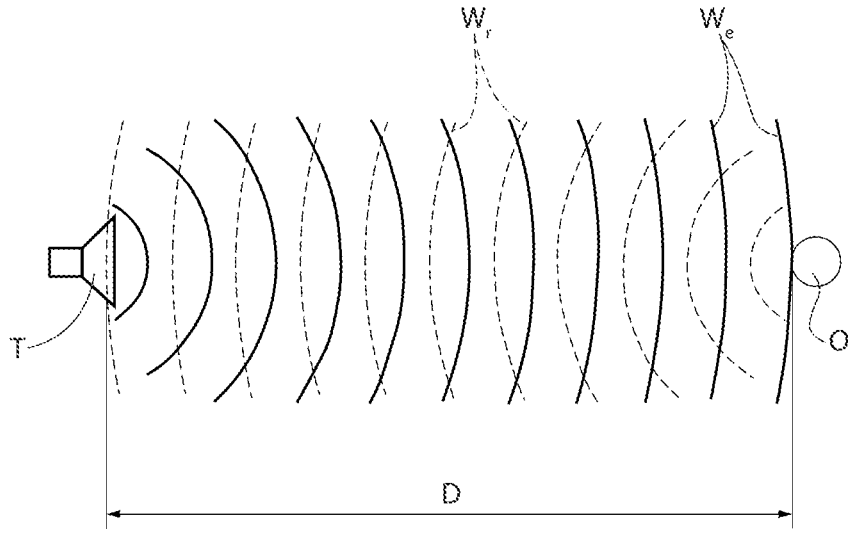
FIG. 1 schematically shows an ultrasonic transducer which generates emitted waves and receives reflected waves to detect the distance of an object.
Figure 2:
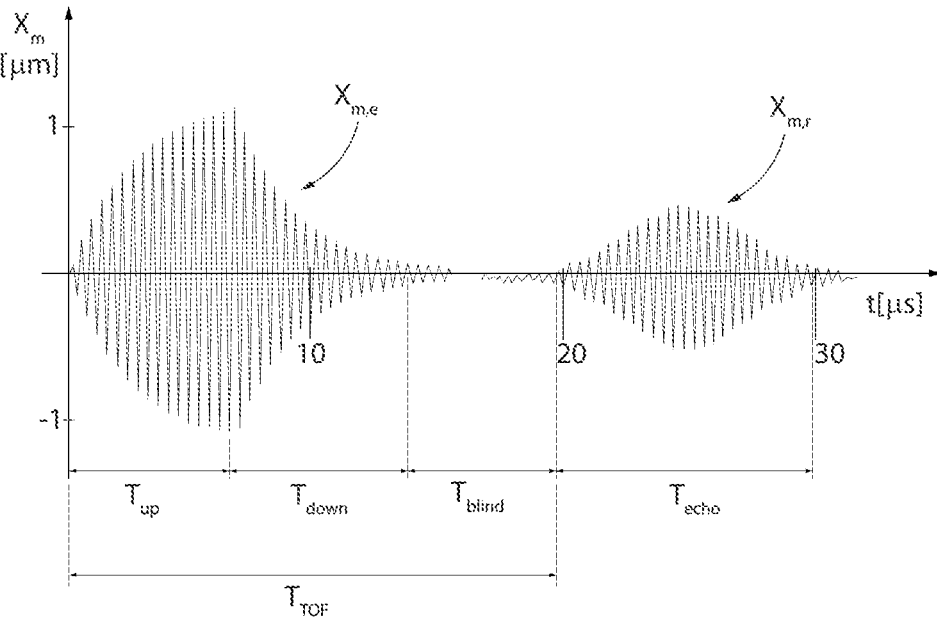
FIG. 2 is a graph showing, as a function of time, the displacement of a membrane of the ultrasonic transducer of FIG. 1 relating to an own rest position, indicative of the emitted wave and of the reflected wave.
Figure 6A:
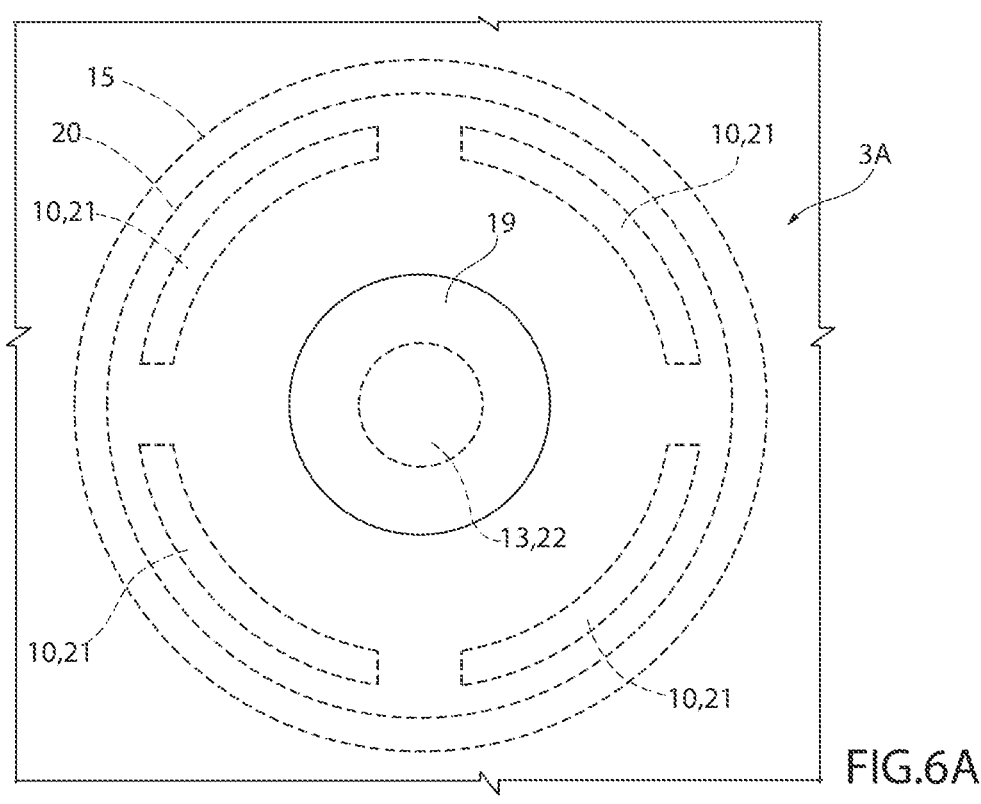
FIGS. 6A and 6B are enlarged top and, respectively, bottom views of the actuator element of FIG. 5.
Figure 6B:
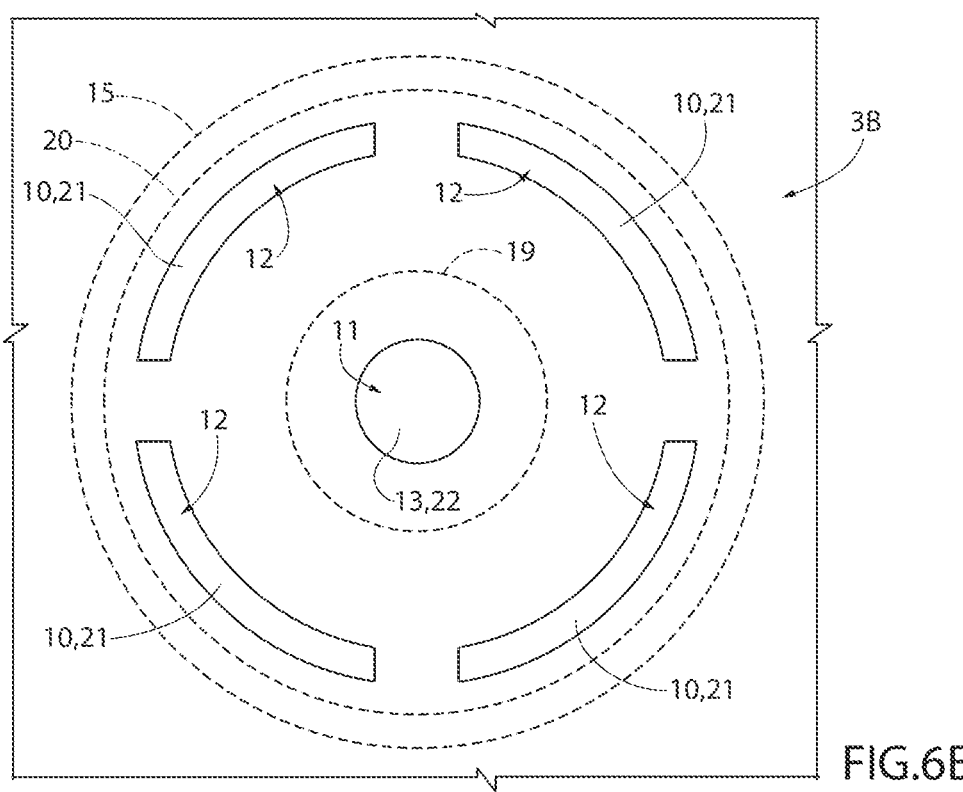

The MUT device 1 comprises one or more MEMS ultrasonic transducer elements (or MUT elements) 5. In the embodiment exemplarily shown in FIG. 1, the MUT device 1 comprises a plurality of MUT elements 5 mutually arranged side by side, for example aligned on rows and columns. In the embodiment of FIG. 1, the MUT elements 5 have a circular shape (see also FIG. 6).

Each MUT element 5 is connected independently, through electrical connections 6 and pads 7, shown schematically, to a control unit 8, generally formed in a different die 9, for example formed as an ASIC (Application Specific Integrated Circuit). Alternatively, the MUT elements 5 may be connected to groups, wherein the MUT elements 5 of a group are controlled separately and the groups are controllable separately, to reduce the number and simplify the electrical connections.

With reference to FIG. 4, the die 2 comprises a semiconductor body 3 of semiconductor material, such as silicon, for example monolithic, having a first and a second main face 3A, 3B and forming the plurality of MUT elements 5.

Each MUT element 5 comprises a central fluidic passage 13 and one or more lateral fluidic passages 10. For each MUT element 5, the central fluidic passage 10 and the one or more lateral fluidic passages 10 open on the second main face 3B by a central opening 11 and, respectively, one or more lateral openings 12 (one for each lateral fluidic passage 10). Optionally, the lateral openings 12 may be connected to an external fluidic circuit not shown, for example to allow the suction of a liquid or a gas contained in a tank, or directly with the external environment, for example for the suction of air from the environment; similarly, the central openings 11 may be connected to an external fluidic circuit not shown or to the outside, according to the intended application.

As shown in detail in FIG. 5, each MUT element 5 further comprises a first chamber 15, arranged in proximity to the first main face 3A of the semiconductor body 3, and a second chamber 20, extending between the first chamber 15 and the second main face 3B of the semiconductor body 3.

Each MUT element 5 further comprises lateral trenches 21 (one for each lateral opening 12) extending between the lateral openings 12 and the second chamber 20, and a central trench 22 extending between the first chamber 15 and the central opening 11, through the second chamber 20. In case each MUT element 5 comprises a single lateral trench 21, the central trench 22 and the lateral trench 21 are arranged side by side to, at a distance from, each other; otherwise, in case each MUT element 5 comprises two or more lateral trenches 21, the central trench 22 is interposed between the lateral trenches 21 (in particular, it is central with respect to the latter which are arranged, in bottom view, around the central trench 22, i.e., they are radially external with respect to the central trench 22).

Each lateral trench 21 defines a respective lateral fluidic passage 10, and the central trench 22 defines the central fluidic passage 13.

The lateral trenches 21, the central trench 22 and the second chamber 20 define a fluidic recirculation path (not shown) that fluidically connects the first chamber 15 with the outside of the MUT device 1. The fluidic recirculation path is configured to allow the recirculation of the fluid or gas present in the first chamber 15, as better described below.

The portion of the semiconductor body 3 between each first chamber 15 and the first main face 3A of the die 2 forms a respective membrane 18 and on each membrane 18, above the first main face 3A, a respective piezoelectric element 19 is arranged.

The first and second chambers 15, 20 (here exemplarily having a circular shape) have centers aligned with each other along a central axis 25. The membrane 18 is therefore concentric with the chambers 15, 20 and, in the example considered, it also has a circular shape. According to the embodiment shown in FIGS. 6A and 6B, the first chamber 15 has an area (in top view in FIG. 6A, or in bottom view in FIG. 6B) that is greater than the second chamber 20, so that one of its peripheral zones, here circular ring shaped, protrudes laterally with respect to the second chamber 20. Nevertheless and in a manner not shown, the first chamber 15 may also have an area that is smaller than or equal to the second chamber 20.

The lateral trenches 21 extend vertically (perpendicularly to the first and second main faces 3A, 3B of the semiconductor body 3) between the lateral openings 12 and the second chamber 20. In the embodiment shown in FIG. 6B, the lateral openings 12 are four for each MUT element 5 and have a curved shape, with a circular crown sector, circumferentially aligned with each other. The lateral trenches 21 here have the same shape and area as the lateral openings 12 and have a smaller internal diameter than the second chamber 20 so that the latter surrounds them at a distance.

The central trench 22 of each MUT element 5 here has a cylindrical shape parallel and concentric to the central axis 25 of the respective MUT element 5, has the same area (in bottom view) as the respective central opening 11, and traverses the second chamber 20 to reach the first chamber 15.

Figure 7:
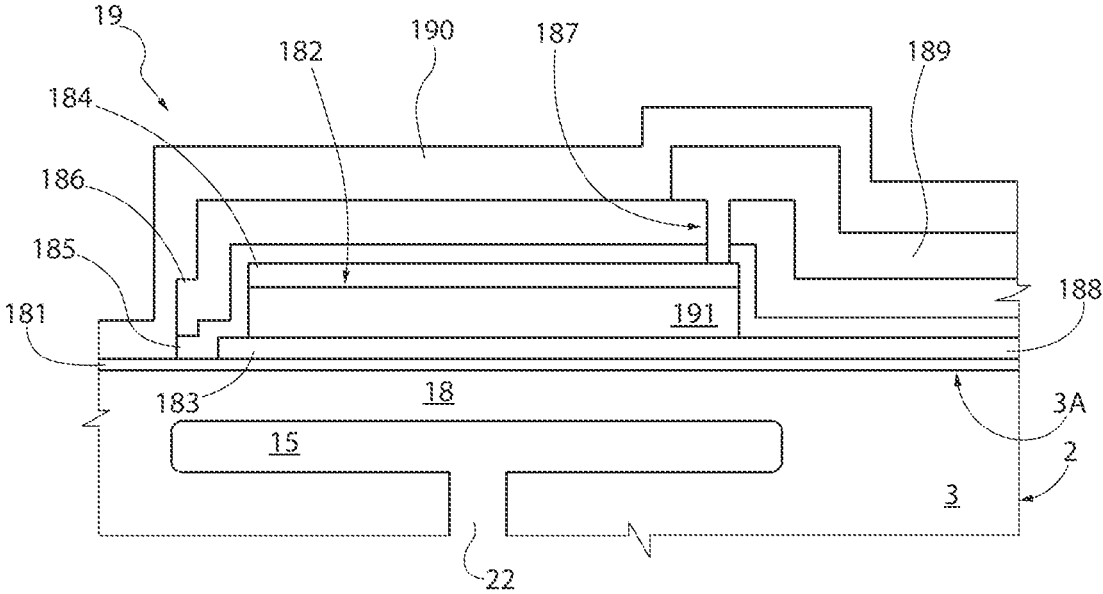
FIG. 7 is an enlarged cross-section of a portion of the actuator element of FIG. 5.

The piezoelectric element 19 may have the structure shown in the section of FIG. 7.

In detail, the piezoelectric element 19 is formed above an insulating layer 181, for example formed by the superposition of a thermally grown silicon oxide layer and a dielectric layer, as hereinafter discussed in detail with reference to FIGS. 8A-8H, and covers the entire first main face 3A of the semiconductor body 3. Above the insulating layer 181, there extends a stack 182 comprising: a bottom electrode 183, of electrically conductive material, for example of titanium (Ti) or platinum (Pt); a thin-film piezoelectric region 191; and an top electrode 184, for example of TiW. The bottom electrode 183 is in electrical contact with a first contact line 188 (for example, it is formed in the same layer and patterned through known photolithographic steps). A first and a second dielectric layer 185, 186, for example of silicon oxide and silicon nitride deposited by CVD (Chemical Vapor Deposition) extend on the stack 182. A second contact line 189 of conductive material, for example of aluminum and/or copper, extends above the dielectric layers 185, 186 and into an opening 187 thereof, to electrically contact the top electrode 184. Optionally, a passivation layer 190, for example of silicon oxide and/or nitride deposited by CVD, covers the entire top surface of the die 2, except for the electrical connection openings (above the pads 7). In practice, the contact lines 188, 189 form the electrical connections 6 of FIG. 3 and allow: in order to generate the emitted wave W$_e$ by the MUT element 5, the electrical connection of one of the electrodes 183, 184 (e.g., the bottom electrode 183 of all the actuator elements 5) to a reference potential, typically to ground, and the bias of the other of the electrodes 183, 184 (e.g., of the top electrode 184) to an alternating actuation voltage; or, in order to detect the reflected wave W$_r$, the acquisition of a detection potential difference between electrodes 183 and 184 induced by the impingement of the reflected wave W$_r$ on the membrane 18.

The MUT device 1 operates similarly to the known devices (e.g., to the ultrasonic transducer T of FIG. 1). In particular, in use the MUT device 1 is surrounded by a propagation medium (a fluid such as liquid or gas, in particular air) wherein acoustic waves (in detail, ultrasonic waves), generated or detected by the MUT device 1, propagate.

When the MUT elements 5 are operated in own transmission modes (i.e., they work as actuators), the membranes 18 are caused to vibrate by the piezoelectric elements 19 and the vibrations of the membranes 18 cause the generation and propagation in the acoustic wave propagation medium. In particular, the alternating actuation voltage (e.g., at a frequency comprised between about 20 kHz and about 100 MHz and with a voltage equal to about 40 V) is applied across the electrodes 183 and 184. The application of the alternating actuation voltage between the electrodes 183 and 184 causes the contraction and expansion of the thin-film piezoelectric region 191 and the consequent deflection of the membrane 18 in the vertical direction, alternately moving away from and towards the chambers 15 and 20, causing corresponding increases and decreases in the volume of the chambers 15 and 20. These volume variations cause the propagation medium (hereinafter, air) present in the first chamber 15 to be moved pneumatically and to undergo recirculation with respect to the environment external to the MUT device 1. In fact, such volume variations allow, in alternate succession to each other, partial depletion and filling steps of the first chamber 15. Each partial depletion step of the first chamber 15 comprises the suction, towards the second chamber 20 and through the central trench 22, of the air present in the first chamber 15 and subsequently its expulsion into the external environment through the central trench 22 and the lateral trenches 21. Each partial filling step of the first chamber 15 instead comprises the suction, through the central trench 22 and the lateral trenches 21 and towards the second chamber 20, of the air present in the external environment and subsequently its introduction into the first chamber 15 through the central trench 22.

When the MUT elements 5 are operated in own reception modes (i.e., they work as sensors), the acoustic waves coming from the propagation medium (i.e., the reflected waves W$_r$) impinge on the membranes 18 and induce the vibration thereof. This induced vibration of each membrane 18 causes both the air recirculation in the first cavity 15, similarly to what has been previously described, and a stress in the piezoelectric element 19 which in turn generates the detection potential difference between the electrodes 183 and 184, indicative of the vibration of the membrane 18 induced by the impinging acoustic waves.

The reception mode and the transmission mode are alternative to each other: the MUT device 1 may therefore operate only in reception, only in transmission, or both in reception and transmission, but in time periods alternated to each other.

The MUT device 1 may be provided, according to an embodiment, as described hereinafter with reference to FIGS. 8A-8H, exemplarily showing the manufacturing of a single MUT element 5 (the other MUT elements 5 of the MUT device 1 are manufactured simultaneously, laterally arranged side by side, in a manner not shown).

Figure 8A:
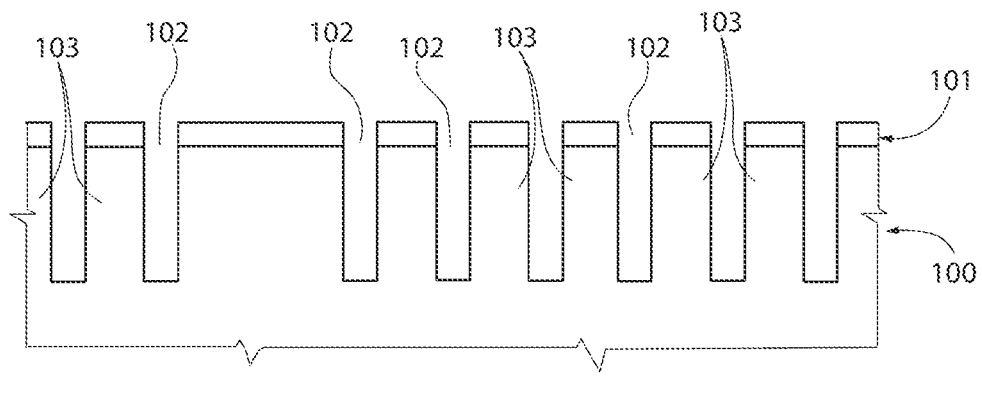
FIGS. 8A-8H show cross-sections of the actuator element of FIG. 5, in subsequent manufacturing steps of an embodiment of a manufacturing process.

Initially, FIG. 8A, the second chamber 20 of each MUT element 5 is formed in a wafer 100 of semiconductor material, for example monocrystalline silicon. For example, the manufacturing process described in the European patent EP1577656 (corresponding to U.S. Pat. No. 8,173,513) and briefly summarized below may be used for the purpose.

In detail, above the wafer 100, a mask 101 of resist is formed having honeycomb lattice openings. Using the mask 101, an anisotropic etch of the wafer 100 is performed, so as to form a plurality of trenches 102, having a depth of for example 15 µm, communicating with each other and delimiting a plurality of columns 103 of silicon.

Figure 8B:
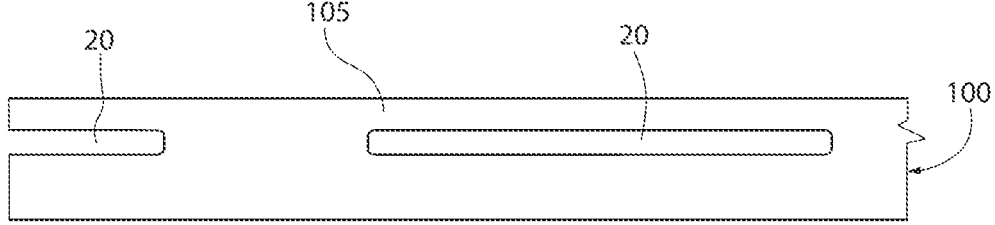

Subsequently, FIG. 8B, the mask 101 is removed and an epitaxial growth is performed in a reducing environment. As a result, an epitaxial layer, for example N-type and having thickness 30 µm, grows above the columns 103, closing the trenches 102 upwardly.

An annealing step is then performed, for example for 30 minutes at 1190° C., preferably in a hydrogen, or, alternatively, nitrogen atmosphere.

As discussed in the aforementioned patents, the annealing step causes a migration of the silicon atoms which tend to move to a lower energy position. As a result, also owing to the close distance between the pillars 103, the silicon atoms of these migrate completely and the second chambers 20 are formed. Above the second chambers 20 a silicon layer remains, partially formed by epitaxially grown silicon atoms and partially by migrated silicon atoms and forming a closing layer 105 of monocrystalline silicon.

Figure 8C:
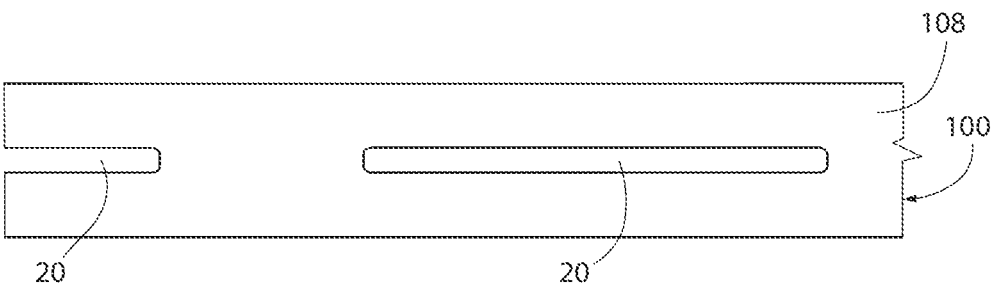

Then, FIG. 8C, another epitaxial growth is performed, with a thickness of a few tens of micrometers, for example equal to 50 µm, from the closing layer 105. In this manner the wafer 100 comprises a first thick region 108 of monocrystalline silicon overlaying the second chambers 20.

Figure 8D:
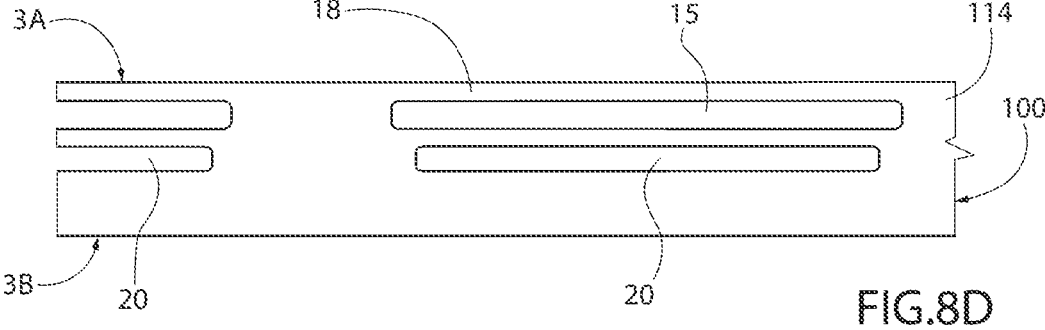

Subsequently, FIG. 8D, the first chambers 15 are formed in the first thick region 108, for example by repeating the manufacturing process described in the European patent EP1577656 and previously described with reference to FIGS. 8A and 8B. In this manner, the wafer 100 has a first and a second face corresponding to the first and second main faces 3A, 3B of the semiconductor body 3 and accommodates, above the second chambers 20, the first chambers 15 and the membranes 18.

Figures 8E, 8F, 8G, 8H:
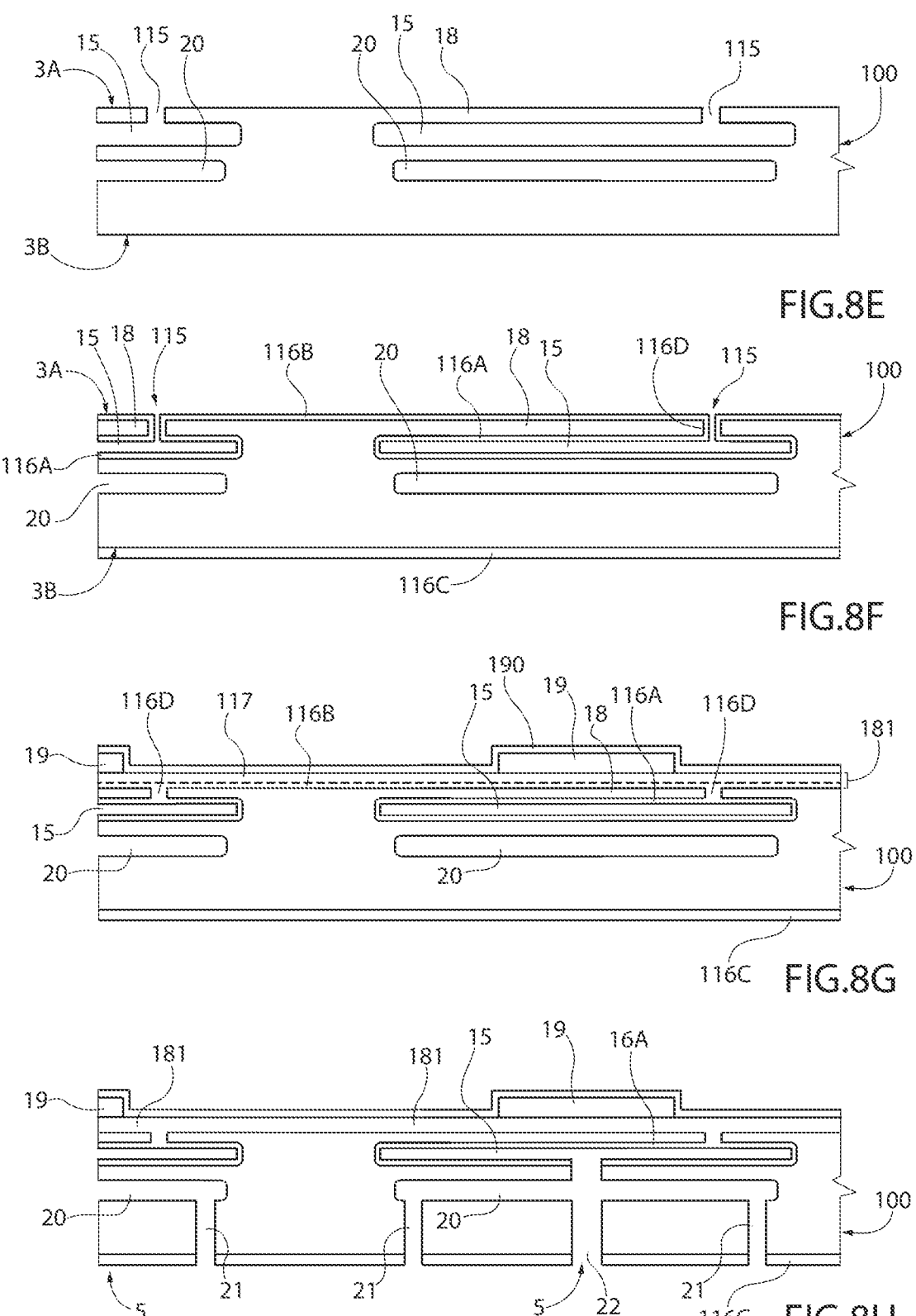

Then, FIG. 8E, using a masking layer not shown, holes 115 are formed, one for each first chamber 15, which extend each from the first face 3A of the wafer 100 to the respective first chamber 15. The holes 115, having diameter of, for example, 2 µm, are preferably formed in proximity to an outer edge of the respective membranes 18, so as not to alter the elastic features thereof.

Then, FIG. 8F, a thermal oxidation is performed, forming an oxide layer with a thickness, for example, of 1 µm. In particular, there are formed a coating oxide portion 116A on the sides of each of the first chambers 15, a first and a second superficial oxide portion 116B and 116C on the faces 3A and, respectively, 3B of the wafer 100 and a closing oxide portion 116D within each of the holes 115. The first chambers 15 are then completely covered by the coating oxide portions 116A and the holes 115 are closed by the closing oxide portions 116D.

Subsequently, FIG. 8G, on the first superficial oxide portion 116B, a dielectric material layer 117, for example of TEOS (tetraethylorthosilicate), is deposited which, together with the first superficial portion 116B, forms the insulating layer 181 of FIG. 7. The dielectric material layer 117 may have, for example, a thickness of 1 µm.

Then, the piezoelectric elements 19 are formed on the dielectric material layer 117. For example, with reference to FIG. 7, first the electrodes 183 and the first contact lines 188 are formed, using known deposition and masking techniques. Then, a thin-film piezoelectric layer (e.g., of PZT—Pb, Zr, TiO3) and an electrode layer are deposited in succession, which are defined by known masking and definition techniques so as to form the thin-film piezoelectric regions 191 and the top electrodes 184. Then, the first and second dielectric layers 186, 186 are deposited and defined, forming the openings 187; the second contact lines 189 are formed and the passivation layer 190, which is thus opened on the pads (not shown), is deposited and defined.

Then, FIG. 8H, a first deep etch of the silicon is performed from the back, through the second superficial oxide portion 116C, up to reaching the second chamber 20, forming the lateral trenches 22 and the lateral openings 11. Furthermore, this etch also forms part of the central trench 22 (up to reaching the second chamber 20) and the central opening 12. In this step, the coating oxide portions 116A operate as an etch stop.

Furthermore, in FIG. 8H, a second deep etch of the silicon is performed from the back, through the central opening 22 up to reaching the first chamber 15 (i.e., through the coating oxide portion 116A), ending the formation of the central trench 22 and putting it in fluid communication with the first chamber 15.

After carrying out the final manufacturing steps, including opening the contacts and dicing the wafer 100, the MUT device 1 of FIGS. 3-6B is obtained.

According to another embodiment shown in FIGS. 9A-9F, the MUT device 1 is provided by using porous silicon and sacrificial regions.

Figures 9A, 9B, 9C, 9D, 9E, 9F:
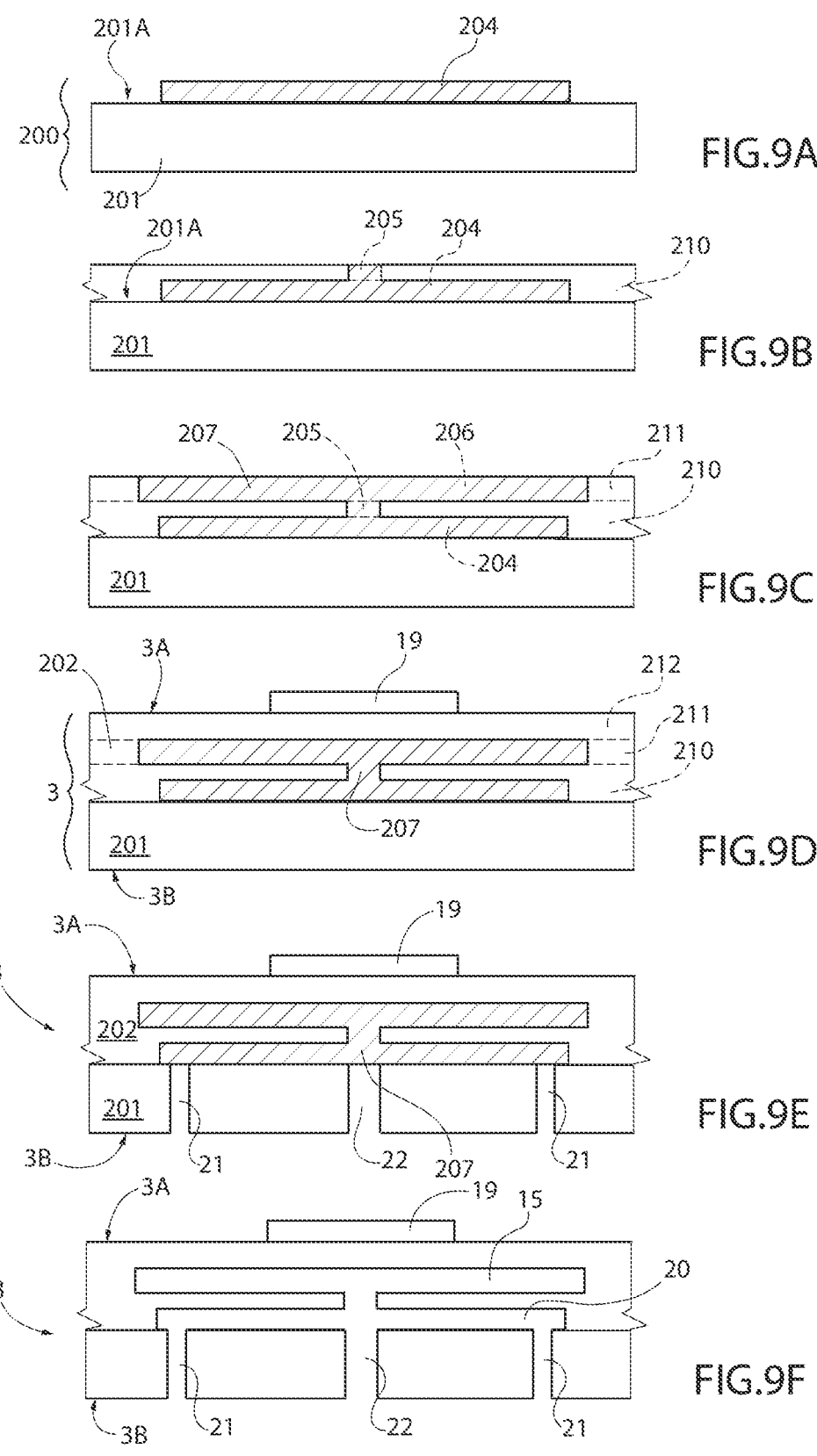
FIGS. 9A-9F show cross-sections of the actuator element of FIG. 5, in subsequent manufacturing steps of a different embodiment of manufacturing process.

In detail, with reference to FIG. 9A, a wafer 200 comprises a substrate 201 of semiconductor material, here silicon, for example monocrystalline, and a first sacrificial region 204, thermally grown or deposited on the substrate 201 (e.g., on a first face 201A of the substrate 201). The first sacrificial region 204 is intended to form the second cavity 20 and may be, for example, of silicon oxide, BPSG (Boron Phosphorous Silicon Glass) or silicon nitride.

In FIG. 9B, a first structural layer 210 of porous silicon is deposited on the first face 201A of the substrate 201 and covers the first sacrificial region 204. For example, the first structural layer 210 may be deposited by an LPCVD ("Low Pressure Chemical Vapor Deposition") process from pure silane gas, at a pressure of 550 mtorr at 600° C. The first structural layer 210 may for example have a thickness comprised between 100 and 150 nm.

In a manner known to the person skilled in the art, the porous silicon of the first structural layer 210 is identified by the presence of micropores which make it permeable to liquids, in particular to etchants, such as HF (hydrofluoric acid).

Furthermore, with reference to FIG. 9B, a second sacrificial region 204 is formed in the first structural layer 210, for example through thermal growth. The second sacrificial region 205 is in contact with the first sacrificial region 204, is intended to form the portion of the central trench 22 comprised between the first and second cavities 15, 20 and may be, for example, of silicon oxide, BPSG (Boron Phosphorous Silicon Glass) or silicon nitride.

Then, FIG. 9C, a second structural layer 211 of porous silicon is deposited on the first structural layer 210 and on the second sacrificial region 205. Furthermore, a third sacrificial region 204 is formed in the second structural layer 211, for example through thermal growth. The third sacrificial region 206 is in contact with the second sacrificial region 205, extends on the latter and on the second sacrificial region 204, is intended to form the first cavity 15 and may be, for example, of silicon oxide, BPSG or silicon nitride. The first, the second and the third sacrificial regions 204, 205, 206 together form a sacrificial region 207 of silicon oxide, BPSG or silicon nitride.

In FIG. 9D, a third structural layer 212 of porous silicon is deposited on the second structural layer 211 and on the third sacrificial region 206. The part of the third structural layer 212 superimposed on the third sacrificial region 206 is intended to form the membrane 18. The first, the second and the third structural layers 210, 211 and 212 together form a structural region 202 of porous silicon. The structural region 202 forms, with the substrate 201, the semiconductor body 3 (where the first main surface 3A is at the structural region 202 and the second main surface 3B is at the substrate 201).

Furthermore, FIG. 9D, the piezoelectric element 19 is formed on the second structural layer 212, similarly to what has been previously described with reference to FIG. 8G.

Then, FIG. 9E, a first deep etch of the silicon is performed from the second main surface 3B up to reaching the sacrificial region 207, forming the lateral trenches 22 and the lateral openings 11. Furthermore, this etch also forms part of the central trench 22 (up to reaching the position of the second chamber 20) and the central opening 12.

In FIG. 9F, a second etch (a chemical etch, e.g., through HF) is performed to remove the sacrificial region 207, for example from the first main surface 3A and through the structural region 202. Since this type of etch allows the removal of silicon oxide (i.e., of the sacrificial region 207), but does not remove the silicon, at the end of the etch the first and second cavities 15 and 20 and the part of the central trench 22 comprised therebetween are formed in the wafer 200, thus obtaining the MUT device 1.

From an examination of the characteristics of the disclosure made according to the present disclosure, the advantages that it affords are evident.

In particular, the MUT device 1 allows, owing to the second chamber 20 and the trenches 21 and 22 of each MUT element 5, the recirculation of the air present in the first cavities 15. It has been verified that this increases the damping of the oscillations of the membranes 18, thus reducing the ring-down interval $T_{down}$. This reduces the probability of superimposition between the emitted wave $W_e$ and the reflected wave $W_r$ and increases the minimum detectable relative distance between the object to be detected and the MUT device 1. In detail, this is due to the fact that the air recirculation generates an energy loss in the oscillations of the membranes 18 and avoids the heating of the air present in the first cavities 15, due to the oscillations of the membranes 18 which periodically compress the volumes of the first cavities 15. Since the ring-down oscillations of the membranes 18 are a function of the air temperature in the first cavities 15, preventing a temperature increase in the first cavities 15 avoids the amplification of the oscillations of the membranes 18, thus improving the measurement accuracy of the MUT device 1. In other words, the bandwidth of the energy spectrum of the oscillations of the membranes 18 grows and, for example, may exceed 35% (unlike the known ultrasonic transducers wherein it is generally less than 5%).

Furthermore, the structure of each MUT element 5 is specifically designed to improve its frequency response. In particular, although the air recirculation in the first cavity 15 may introduce spurious peaks in the frequency spectrum of the acoustic pressure present on the membrane 18 (i.e. additional peaks with respect to the desired peak which is indicative of the oscillations of the membrane 18 caused by the emitted wave $W_e$ and by the reflected wave $W_r$), having the membranes 18 at the first main surface 3A of the semiconductor body 3 and the central and lateral trenches 22, 21 facing the second main surface 3B of the semiconductor body 3 minimizes the number and the amplitude of these spurious peaks and increases the frequency distance thereof with respect to the peak indicative of the emitted wave $W_e$ and of the reflected wave $W_r$; this prevents such possible spurious peaks from superimposing on the peak indicative of the emitted wave $W_e$ and the reflected wave $W_r$, and therefore from affecting the measurement of the distance of the object to be detected (as it would happen instead if at least part of the trenches 21 and 22 were facing the first main surface 3A also having the membranes 18 facing thereto).

The structure of the MUT elements 5 allows the detection of the distance of the objects to be detected without requiring the use of post-processing algorithms of the detected signals, and minimizes the dependence of the measurement on external variable factors such as the properties of the propagation medium (unlike the known solutions).

The MUT device 1 has small external dimensions and high flexibility and versatility.

For example, with the solution described, it is possible to form a die 2 having side S=20 mm comprising 1600 (40×40) MUT elements 5 each having a diameter K (dimension of the second chamber 20, see FIG. 3) of 460 μm and arranged at a distance L of 40 μm. The thickness of the die 2 (thickness of the semiconductor body 3) may be between 200 and 710 μm.

Furthermore, in each MUT element 5, the first chamber 15 may have a diameter of 350 μm and thickness 3.5 μm, the second chamber 20 may have a diameter of 460 μm and thickness 3 μm, the distance $d_{cc}$ (FIG. 5) between the first chamber 15 and the second chamber 20 may be variable between about 3 μm and about 40 μm and the membrane 18 may have, for example, a thickness of about 6 μm. The central trench 21 may have a diameter $d_t$ comprised between about 3 μm and about 60 μm and the lateral trenches 22 have a smaller diameter than the central trench 21 and for example may have a diameter of 13 μm. The thin-film piezoelectric region 191 may have a thickness of 2 μm and the piezoelectric element 19 may have an overall thickness comprised between 2.1 and 3 μm.

Figure 10:
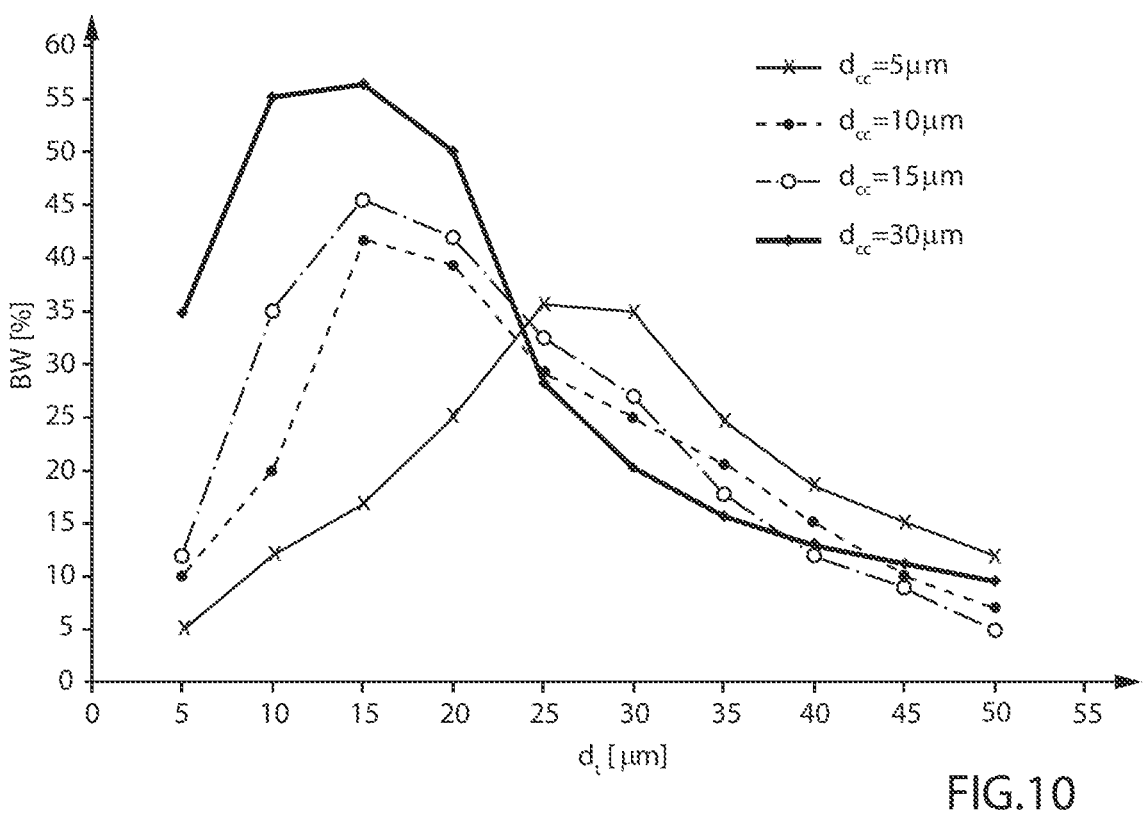
FIG. 10 is a graph showing the trend of a bandwidth of the ultrasonic transducer device of FIG. 3 as a function of some physical quantities of the same.

In particular, FIG. 10 shows the dependence of the bandwidth BW (e.g., at-3 dB) of the energy spectrum of the oscillations of the membranes 18 as a function of the distance $d_{cc}$ and the diameter $d_t$. As the distance $d_{cc}$ increases, the maximum value of bandwidth BW increases, and as the diameter $d_t$ increases, the bandwidth BW has an increasing and then decreasing trend, with the maximum value of bandwidth BW which is at diameters di that increase the more the distance $d_{cc}$ decreases. In particular, the bandwidth BW is maximized when the diameter $d_t$ is comprised between about 10 µm and about 35 µm and the distance $d_{cc}$ is comprised between about 5 µm and about 30 µm.

The values indicated above are however only indicative and in particular the shape and dimensions of the chambers 15, 20 and of the trenches 21, 22 may vary widely, according to the application and the desired flow volumes.

Figure 11:
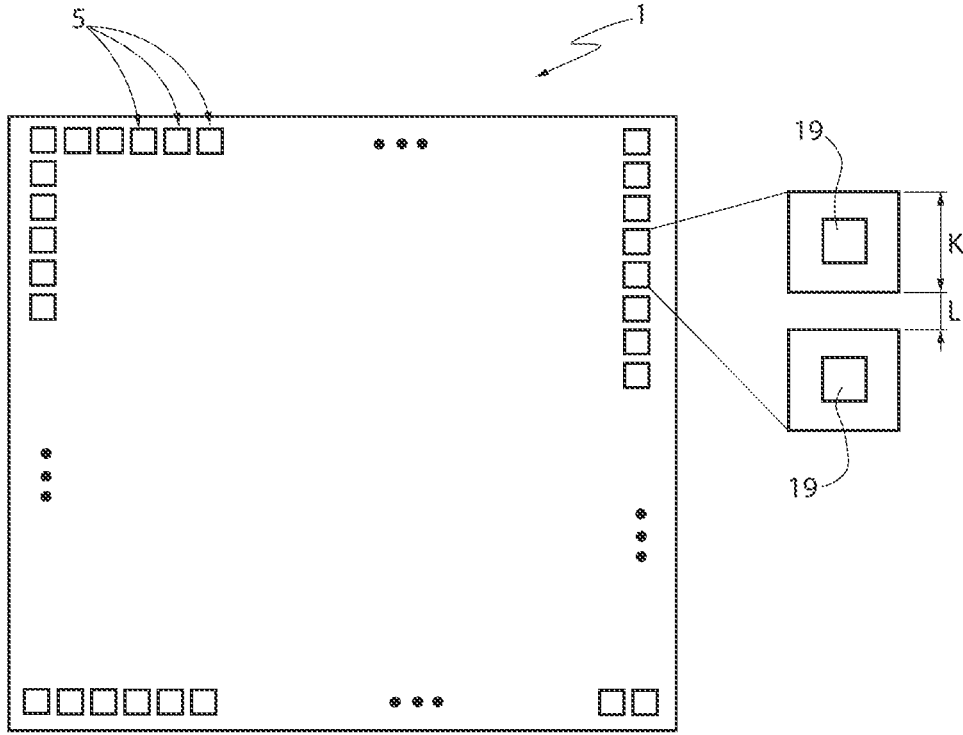
FIG. 11 is a top view of a different embodiment of the present ultrasonic transducer device.

For example, according to a different embodiment (FIG. 11) the MUT device 1 comprises a plurality of MUT elements 5 of quadrangular shape, for example squared, having side K=350 µm (side of the second chamber 20), arranged at a distance L=40 µm. The piezoelectric element 19 is also squared herein. Other shapes (e.g., oval, hexagonal, octagonal, etc.) and other dimensions are however possible.

Finally, it is clear that modifications and variations may be made to the disclosure described and illustrated herein without thereby departing from the scope of the present disclosure, as defined in the attached claims.

For example, the shape of the lateral trenches 21 and of the lateral openings 12 may vary, as well as their number (e.g., three or more lateral openings 12 for each MUT element 5 and with curved shape, with a circular crown sector, circumferentially aligned with each other; or two lateral openings 12 opposite to each other with respect to the central opening 11, or even just one lateral opening 12). Furthermore, the lateral trenches 21 may be connected to a single supply channel which opens to the outside.

A MEMS ultrasonic transducer, MUT, device (1), may be summarized as including a semiconductor body (3) of semiconductor material having a first (3A) and a second (3B) main surface and integrating a first MUT element (5) which includes a first chamber (15) extending into the semiconductor body (3) at a distance from the first main surface (3A); a membrane (18) formed by the semiconductor body (3) between the first main surface (3A) and the first chamber (15); a piezoelectric element (19) extending on the first main surface (3A) of the semiconductor body (3) above the membrane (18); a second chamber (20) extending into the semiconductor body (3) between the first chamber (15) and the second main surface (3B); a central fluidic passage (22) extending into the semiconductor body (3) from the second main surface (3B) to the first chamber (15) and traversing the second chamber (20); and one or more lateral fluidic passages (21) extending into the semiconductor body (3) from the second main surface (3B) to the second chamber (20), wherein the one or more lateral fluidic passages (21), the central fluidic passage (22) and the second chamber (20) define a fluidic recirculation path that fluidically connects the first chamber (15) with the outside of the semiconductor body (3).

The fluidic recirculation path may be configured to allow the recirculation of the propagation medium between the first chamber (15) and the outside of the semiconductor body (3), said recirculation being caused by the alternate succession of expansions and contractions of a volume of the first and the second chambers (15, 20), which are generated by the oscillations of the membrane (18) and which pump the propagation medium into and, respectively, out of the first chamber (15).

The first (15) and second (20) chambers may be concentric and aligned along a central axis (25) of the first MUT element (5), orthogonal to the first main surface (3A), wherein the central fluidic passage (22) may be arranged centrally with respect to the first (15) and second (20) chambers and may be aligned along the central axis (25), and the one or more lateral fluidic passages (21) may be radially external with respect to the central fluidic passage (22) around the central axis (25).

The MUT device may include a plurality of said lateral fluidic passages (21) which are arranged around the central fluidic passage (22).

The lateral fluidic passages (21) may have, parallel to the second main surface (3B), curved shape and laterally surround at a distance the central fluidic passage (22).

The first and second chambers (15, 20) may have a circular shape or have a polygonal shape.

The piezoelectric element (19) may include a layer stack (182) including a first and a second electrode (183, 184) and a thin-film piezoelectric region (191) arranged between the first and second electrodes, the MUT device may further include a plurality of electrical connection lines (6) configured to selectively couple at least one of the first and second electrodes (183, 184) of the first MUT element (5) to a control unit (8).

The central fluidic passage (22) may be formed by a central trench which defines a central opening (11) in the second main surface (3B), and the one or more lateral fluidic passages (21) may be formed by one or more respective lateral trenches, each defining a respective lateral opening (12) in the second main surface (3B).

The MUT device may further include integrating one or more second MUT elements (5), each including a respective first chamber (15) extending into the semiconductor body (3) at a distance from the first main surface (3A); a respective membrane (18) formed by the semiconductor body (3) between the first main surface (3A) and the first chamber (15) of the second MUT element (5); a respective piezoelectric element (19) extending on the first main surface (3A) of the semiconductor body (3) above the membrane (18) of the second MUT element (5); a respective second chamber (20) extending into the semiconductor body (3) between the first chamber (15) of the second MUT element (5) and the second main surface (3B); a respective central fluidic passage (22) extending into the semiconductor body (3) from the second main surface (3B) to the first chamber (15) of the second MUT element (5) and traversing the second chamber (20) of the second MUT element (5); and one or more respective lateral fluidic passages (21) extending into the semiconductor body (3) from the second main surface (3B) to the second chamber (20) of the second MUT element (5), wherein the one or more lateral fluidic passages (21), the central fluidic passage (22) and the second chamber (20) of the second MUT element (5) define a respective fluidic recirculation path that fluidically connects the first chamber (15) of the second MUT element (5) with the outside of the semiconductor body (3).

A process for manufacturing a MEMS ultrasonic transducer, MUT, device (1), may be summarized as including the steps of forming, in a semiconductor body (3) of semiconductor material having a first (3A) and a second (3B) main surface, a first chamber (15) extending into the semiconductor body (3) at a distance from the first main surface (3A), wherein a portion of the semiconductor body (3) extending between the first main surface (3A) and the first chamber (15) forms a membrane (18); forming, in the semiconductor body (3), a second chamber (20) extending between the first chamber (15) and the second main surface (3B); forming, on the first main surface (3A) of the semiconductor body (3) and above the membrane (18), a piezoelectric element (19); forming, in the semiconductor body (3), a central fluidic passage (22) extending from the second main surface (3B) to the first chamber (15) and traversing the second chamber (20); and forming, in the semiconductor body (3), one or more lateral fluidic passages (21) extending from the second main surface (3B) to the second chamber (20), wherein the first chamber (15), the membrane (18), the piezoelectric element (19), the second chamber (20), the central fluidic passage (22) and the one or more lateral fluidic passages (21) define a first MUT element (5) of the MUT device (1), and wherein the one or more lateral fluidic passages (21), the central fluidic passage (22) and the second chamber (20) define a fluidic recirculation path that fluidically connects the first chamber (15) with the outside of the semiconductor body (3).

Forming the central fluidic passage (22) may include removing a selective portion of the semiconductor material wafer (100) from the second face (3B) traversing the second chamber (20) to the first chamber (15), and forming the one or more lateral fluidic passages (21) may include removing one or more respective selective portions of the semiconductor material wafer (100) from the second face (3B) to the second chamber (20).

Forming the second chamber (20) may include forming a plurality of first trenches (102) mutually separated by first pillar structures (103) in a substrate (100) of semiconductor material; performing an epitaxial growth in a reducing environment to form a first semiconductor material superficial layer (105) closing the first trenches (102) upwardly; and carrying out an annealing such that it causes a migration of semiconductor material atoms of the first pillar structures (103) and the formation of the second chamber (20), and forming the first chamber (15) may include performing a second epitaxial growth to form a thick region (108); forming a plurality of second trenches mutually separated by second pillar structures in the thick region; performing a second epitaxial growth in a reducing environment to form a second semiconductor material superficial layer closing the second trenches upwardly; and carrying out an annealing such that it causes a migration of semiconductor material atoms of the second pillar structures and the formation of the first chamber (15) and of the membrane (18).

The process may include, before forming the central fluidic passage (22), forming one or more holes (115) extending from the first face (3A) of the semiconductor material wafer (100) to the first chamber (15) and forming an oxide layer (16A) coating the first chamber (15) and closing the one or more holes (115).

Forming the first chamber (15) and forming the second chamber (20) may include forming, on a first face (201A) of a substrate (201) of semiconductor material, a first sacrificial region (204) adapted to form the second cavity (20); forming, on the first face (201A) of the substrate (201) and on the first sacrificial region (204), a first structural layer (210) of porous silicon and a second sacrificial region (205) superimposed on, and in contact with, the first sacrificial region (204) and adapted to form a portion of the central fluidic passage (22) between the first cavity (15) and the second cavity (20), the first structural layer (210) extending laterally to the second sacrificial region (205); forming, on the first structural layer (210) and on the second sacrificial region (205), a second structural layer (211) of porous silicon and a third sacrificial region (206) superimposed on, and in contact with, the second sacrificial region (205) and part of the first structural layer (210) and adapted to form the first cavity (15), the second structural layer (211) extending laterally to the third sacrificial region (206); forming, on the second structural layer (211) and on the third sacrificial region (206), a third structural layer (212) of porous silicon adapted to form the membrane (18); and removing the first, the second and the third sacrificial regions (204, 205, 206)

by etching through the first, the second and the third structural layers (210, 211, 212), respectively forming the first cavity (15), the portion of the central fluidic passage (22) between the first cavity (15) and the second cavity (20), and the second cavity (20).

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a semiconductor body of semiconductor material having a first and a second main surface and integrating a first MUT element which includes:
a first chamber extending into the semiconductor body at a distance from the first main surface;
a membrane formed by the semiconductor body between the first main surface and the first chamber;
a piezoelectric element extending on the first main surface of the semiconductor body above the membrane;
a second chamber extending into the semiconductor body between the first chamber and the second main surface;
a central fluidic passage extending into the semiconductor body from the second main surface to the first chamber and traversing the second chamber; and
one or more lateral fluidic passages extending into the semiconductor body from the second main surface to the second chamber,
wherein the one or more lateral fluidic passages, the central fluidic passage and the second chamber define a fluidic recirculation path that fluidically connects the first chamber with the outside of the semiconductor body.

2. The device according to claim 1, configured to be immersed in a liquid or gaseous propagation medium that extends from the outside of the semiconductor body to the first chamber,
wherein the fluidic recirculation path is configured to allow the recirculation of the propagation medium between the first chamber and the outside of the semiconductor body, the recirculation being caused by the alternate succession of expansions and contractions of a volume of the first and the second chambers, which are generated by oscillations of the membrane and which pump the propagation medium into and, respectively, out of the first chamber.

3. The device according to claim 1, wherein the first and second chambers are concentric and aligned along a central axis of the first MUT element, orthogonal to the first main surface,
wherein the central fluidic passage is arranged centrally with respect to the first and second chambers and is aligned along the central axis, and
wherein the one or more lateral fluidic passages are radially external with respect to the central fluidic passage around the central axis.

4. The device according to claim 3, wherein the one or more fluidic lateral passages are a plurality of the lateral fluidic passages which are arranged around the central fluidic passage.

5. The device according to claim 4, wherein the plurality of lateral fluidic passages have, parallel to the second main surface, a curved shape and laterally surround, at a distance, the central fluidic passage.

6. The device according to claim 1, wherein the first and second chambers have a circular shape or have a polygonal shape.

7. The device according to claim 1, further comprises a plurality of electrical connection lines and a control unit, the plurality of electrical connection lines configured to selectively couple at least one of the first and second electrodes of the first MUT element to the control unit, and wherein the piezoelectric element comprises a layer stack including a first and a second electrode and a thin-film piezoelectric region arranged between the first and second electrodes.

8. The device according to claim 1, wherein the central fluidic passage is formed by a central trench which defines a central opening in the second main surface, and wherein the one or more lateral fluidic passages are formed by one or more respective lateral trenches, each defining a respective lateral opening in the second main surface.

9. The device according to claim 1, further comprising one or more second MUT elements, each of the one or more second MUT elements including:

a respective first chamber extending into the semiconductor body at a distance from the first main surface;

a respective membrane formed by the semiconductor body between the first main surface and the first chamber of the second MUT element;

a respective piezoelectric element extending on the first main surface of the semiconductor body above the membrane of the second MUT element;

a respective second chamber extending into the semiconductor body between the first chamber of the second MUT element and the second main surface;

a respective central fluidic passage extending into the semiconductor body from the second main surface to the first chamber of the second MUT element and traversing the second chamber of the second MUT element; and one or more respective lateral fluidic passages extending into the semiconductor body from the second main surface to the second chamber of the second MUT element, wherein the one or more lateral fluidic passages, the central fluidic passage and the second chamber of the second MUT element define a respective fluidic recirculation path that fluidically connects the first chamber of the second MUT element with the outside of the semiconductor body.

10. A device, comprising:

a semiconductor body of semiconductor material having a first main face and a second main face opposite to the first main face;

a first chamber within the semiconductor body;

a second chamber within the semiconductor body, the second chamber is between the first chamber and the second main face;

a central fluidic passage that extends into the second main face, extends through the second chamber, and extends to the first chamber;

a plurality of lateral fluidic passages extends into the second main face to the second chamber, and each respective lateral fluidic passage of the plurality of lateral fluidic passages is spaced laterally outward from the central fluidic passage;

a membrane that extends from the first chamber to the first main face; and a piezoelectric element on the first main face of the semiconductor body, and the piezoelectric element fully overlaps the central fluid passage.

11. The device of claim 10, wherein the first chamber is spaced apart from the second chamber by a distance that is within a range from 3 micrometers (μm) to 40 micrometers (μm), or is equal to a lower end or an upper end of the range.

12. The device of claim 10, wherein the respective lateral fluidic passages of the plurality of lateral fluidic passages are curved.

13. The device of claim 10, wherein the membrane is concentric with the first chamber and the second chamber.

14. The device of claim 10, wherein a first center of the central fluidic passage, a second center of the first chamber, a third center of the second chamber, a fourth center of the membrane, and a fifth center of the piezoelectric element are along a central axis, and the central axis is transverse to the first main surface and a second main surface of the semiconductor body.

15. A device, comprising:

a semiconductor body of semiconductor material having a first main face and a second main face opposite to the first main face;

a first chamber within the semiconductor body, the first chamber having a first diameter;

a second chamber within the semiconductor body, the second chamber is between the first chamber and the second main face, the second chamber having a second diameter less than the first diameter;

a central fluidic passage that extends into the second main face, extends through the second chamber, and extends to the first chamber, the central fluidic passage includes a third diameter less than the first diameter and less than the second diameter;

a plurality of lateral fluidic passages extends into the second main face to the second chamber, and each respective lateral fluidic passage of the plurality of lateral fluidic passages is spaced laterally outward from the central fluidic passage;

a membrane that extends from the first chamber to the first main face, the membrane being concentric with the first chamber and the second chamber; and a piezoelectric element on the first main face of the semiconductor body, and the piezoelectric element fully overlaps the central fluid passage.

16. The device of claim 15, wherein the piezoelectric element is concentric with the central fluidic passage, the first chamber, the second chamber, and the membrane.

17. The device of claim 15, wherein the piezoelectric element has a fourth diameter that is less than the first diameter, less than the second diameter, and greater than the third diameter.

18. The device of claim 15, wherein the respective fluidic passages of the plurality of lateral fluidic passages are curved.

19. The device of claim 15, wherein the first chamber is spaced apart from the second chamber by a distance that is within a range from 3 micrometers (μm) to 40 micrometers (μm), or is equal to a lower end or an upper end of the range.

20. The device of claim 15, wherein a first center of the central fluidic passage, a second center of the first chamber, a third center of the second chamber, a fourth center of the membrane, and a fifth center of the piezoelectric element are along a central axis, and the central axis is transverse to the first main surface and the second main face of the semiconductor body.

\* \* \* \* \*